United States Patent [19]

Luedi

[11] 4,050,135
[45] Sept. 27, 1977

[54] FLAT BASE TRUCK RIM FORMING SYSTEM

[75] Inventor: Hans R. Luedi, Highland Park, Ill.

[73] Assignee: Grotnes Machine Works, Inc., Chicago, Ill.

[21] Appl. No.: 595,064

[22] Filed: July 11, 1975

[51] Int. Cl.² ............................................. B21K 1/38
[52] U.S. Cl. .................................... 29/159.1; 72/354
[58] Field of Search ............ 29/159.1, 159.01, 159 R; 72/354, 355, 356, 393; 113/116 D

[56] References Cited

U.S. PATENT DOCUMENTS

| | | | |
|---|---|---|---|
| 2,983,033 | 5/1961 | Cox | 29/159.01 |
| 3,224,243 | 12/1965 | Van Deberg | 72/354 |
| 3,282,078 | 11/1966 | Kaesemeyer | 29/159 R |
| 3,381,353 | 5/1968 | Lemmerz | 29/159.1 |
| 3,438,111 | 4/1969 | Wilcox | 29/159.1 |
| 3,688,373 | 9/1972 | Gregg | 29/159.01 |
| 3,706,120 | 12/1972 | Bulgrin | 29/159.1 |
| 3,756,063 | 9/1973 | Roze et al. | 29/159.3 |
| 3,846,886 | 11/1974 | Schroder et al. | 29/159.1 |

FOREIGN PATENT DOCUMENTS

| | | | |
|---|---|---|---|
| 140,023 | 1/1951 | Australia | 29/159.1 |

*Primary Examiner*—C.W. Lanham
*Assistant Examiner*—Daniel C. Crane
*Attorney, Agent, or Firm*—Leydig, Voit, Osann, Mayer & Holt, Ltd.

[57] ABSTRACT

A system for forming flat base truck rims from flat strips of steel rolled into the form of smooth cylinders and welded together along the abutting axial edges. The system is capable of forming rims from hot rolled, rimmed, low carbon steel strips. The smooth cylinder is initially formed by a plurality of dies located at opposite ends of the cylinder and mounted for advancing movement relatively toward each other in the direction of the cylinder axis to flare a first end of the cylinder radially outwardly while rough forming a rim gutter on the other end of the cylinder. The radial thickness of the metal forming the rim gutter is increased during the rough forming thereof by applying a compressive axial load to the cylinder and providing a gutter-forming die cavity wider than the starting thickness of the cylinder. The rim gutter is warm or hot formed by heating that end of the cylinder before advancing the dies to roughly form the gutter. The flaring step is performed with an expandable die which is expanded during the flaring step and then collapsed and advanced to deform the outwardly flared portion of the cylinder to rough form a fixed flange, so that different portions of the same die are used to effect both the flaring and the flange forming. The flat base of the rim is shear formed to reduce the radial thickness thereof in the low stress area between the gutter and the fixed flange. The final profile in the fixed flange and the gutter is produced by roll forming the rim.

13 Claims, 6 Drawing Figures

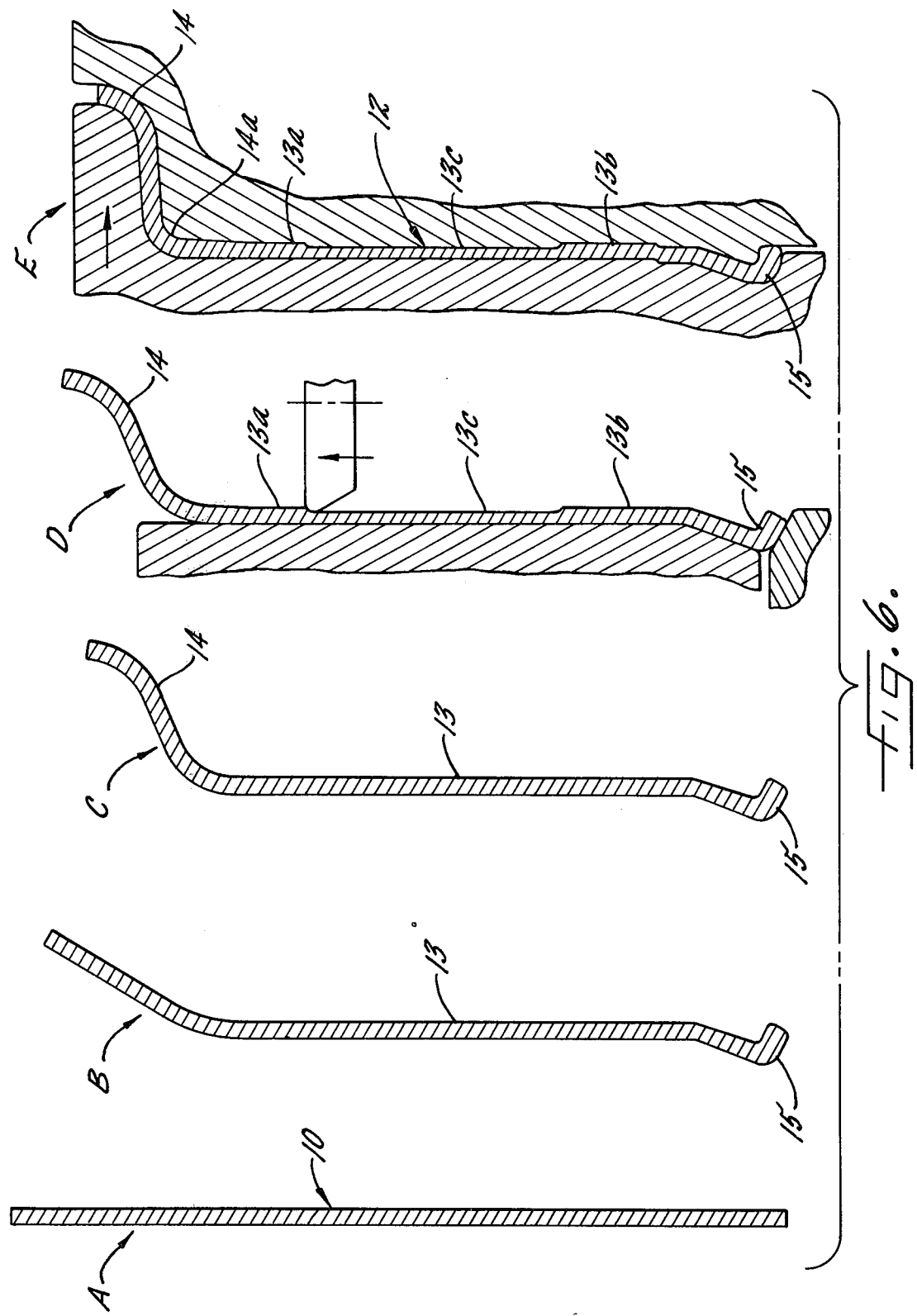

FLAT BASE TRUCK RIM FORMING SYSTEM

DESCRIPTION OF THE INVENTION

The present invention relates generally to the forming of flat base truck rims and, more particularly, to the forming of such rims from flat strip.

In the past, flat base truck rims have been formed from two different types of stock, namely, pre-formed mill sections and plain flat strip. In recent years, there has been an increasing interest in starting with flat strip because of increasing difficulty in obtaining the mill sections, the higher cost of the mill sections, and the difficulty of removing weld flash and finishing the weld seam in rims made from mill sections. At the present time, one of the systems being used for forming rims from flat strip is essentially the same as that described in U.S. Pat. No. 2,944,502 to P. Lemmerz. That system starts with draw quality steel which is formed in multiple steps which are both cumbersome and time consuming, resulting in production rates on the order of about 80 to 100 rims per hour. To form the rim gutter with greater radial thickness of metal in the area of maximum stress in the rim, the Lemmerz system forms the rim gutter while applying a compressive load to the rim blank. This forming operation increases the metal thickness by as much as 15–20 per cent, and the resulting rim is generally treated by shot peening in the gutter area to improve the fatigue life of the metal in that area.

Another system that has been used for form flat base rims from flat strip is the Leifeld system, which also uses draw quality flat strip as the starting material. This system starts with flat strip having the thickness required in the maximum stress area of the rim, and forms the rim by a combination of cold forming steps which severely reduce the strip thickness in the low stress areas of the rim. For example, a typical Leifeld system starts with strip stock with a 12 mm thickness; forms the rim gutter in a first spinning operation; reduces the thickness of the entire rim blank except the gutter to 8 mm in a second spinning operation; reduces the thickness of the base portion of the rim to 6 mm in a third spinning operation; and forms the fixed rim flange in a fourth spinning operation. Various trimming and expanding steps are also involved in the Leifeld system, which achieves production rates of 80 to 100 rims per hour.

It is a principal object of the present invention to provide an improved system for producing flat base truck rims from flat strip at production rates of 250 to 350 rims per hour.

It is another object of this invention to provide an improved system for producing high quality flat base truck rims from flat strip made of hot rolled, rimmed, low carbon steel, which can be obtained at a substantially lower cost than draw quality steel strip. In this connection, a related object is to provide such a system which can increase the metal thickness by as much as 30–50 per cent in the high stress areas of the rim.

A further object of the invention is to provide such an improved system for producing flat base truck rims from flat strip which avoids excessive cold working of the flat strip and does not require shot peening of the rim gutter.

Still another object of the invention is to provide such an improved rim forming system which requires only a relatively small number of process steps which can be carried out efficiently and economically by automated equipment.

Other objects and advantages of the invention will be apparent from the following detailed description and the accompanying drawings, in which.

Figure 2:
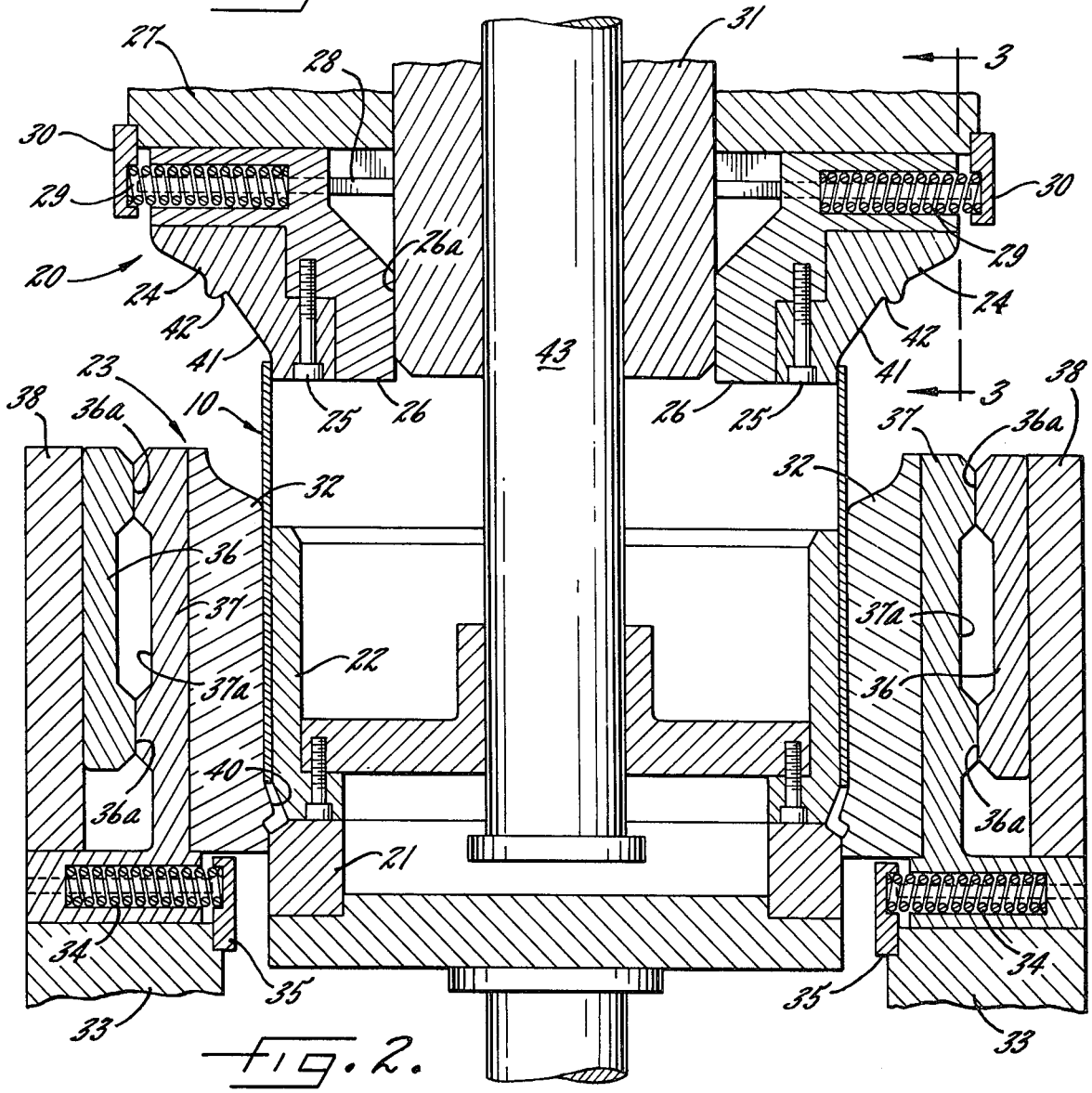
FIG. 2 is an enlarged vertical section of die forming apparatus for partially forming flat base truck rims in accordance with the invention, with the top die in its expanded and a partially advanced position.
Figure 4:
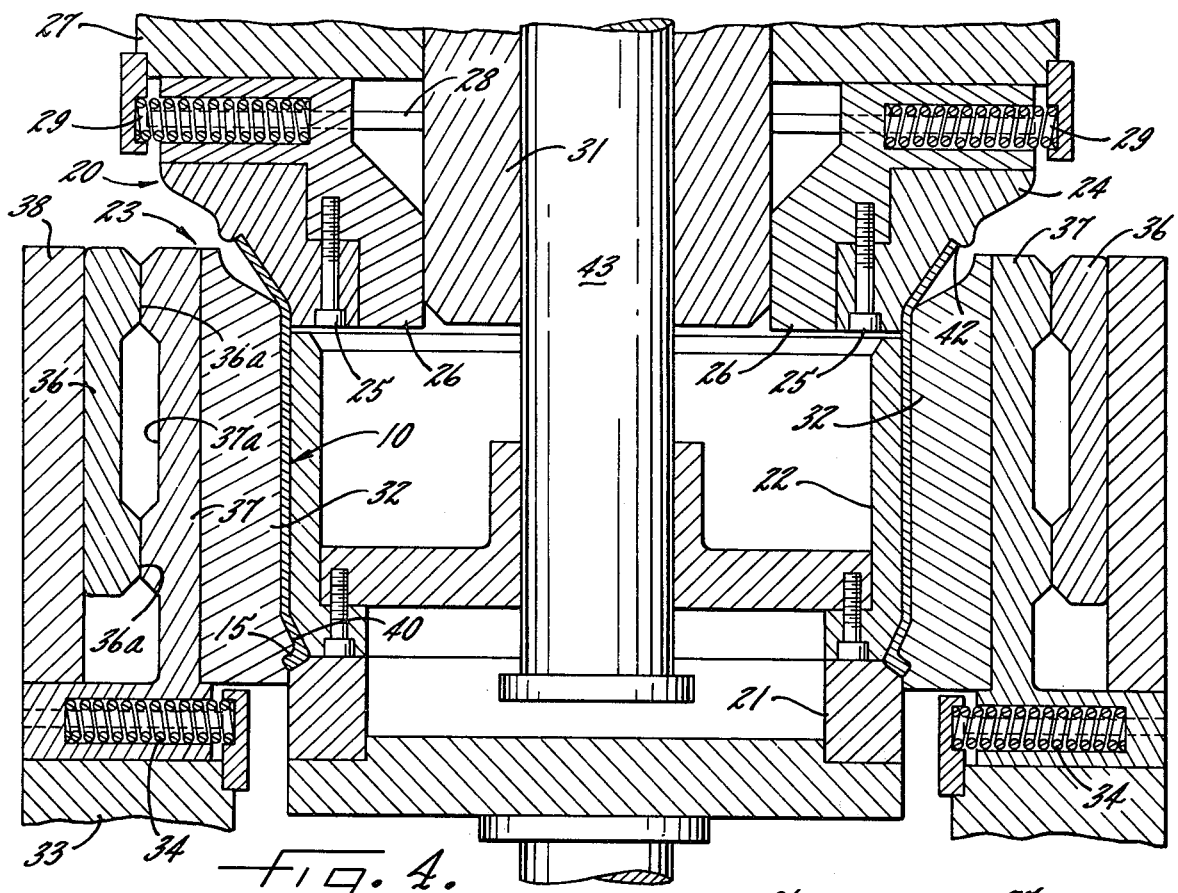
FIG. 4 is the same vertical section shown in FIG. 2 with the top die in its expanded and further advanced position.
Figure 5:
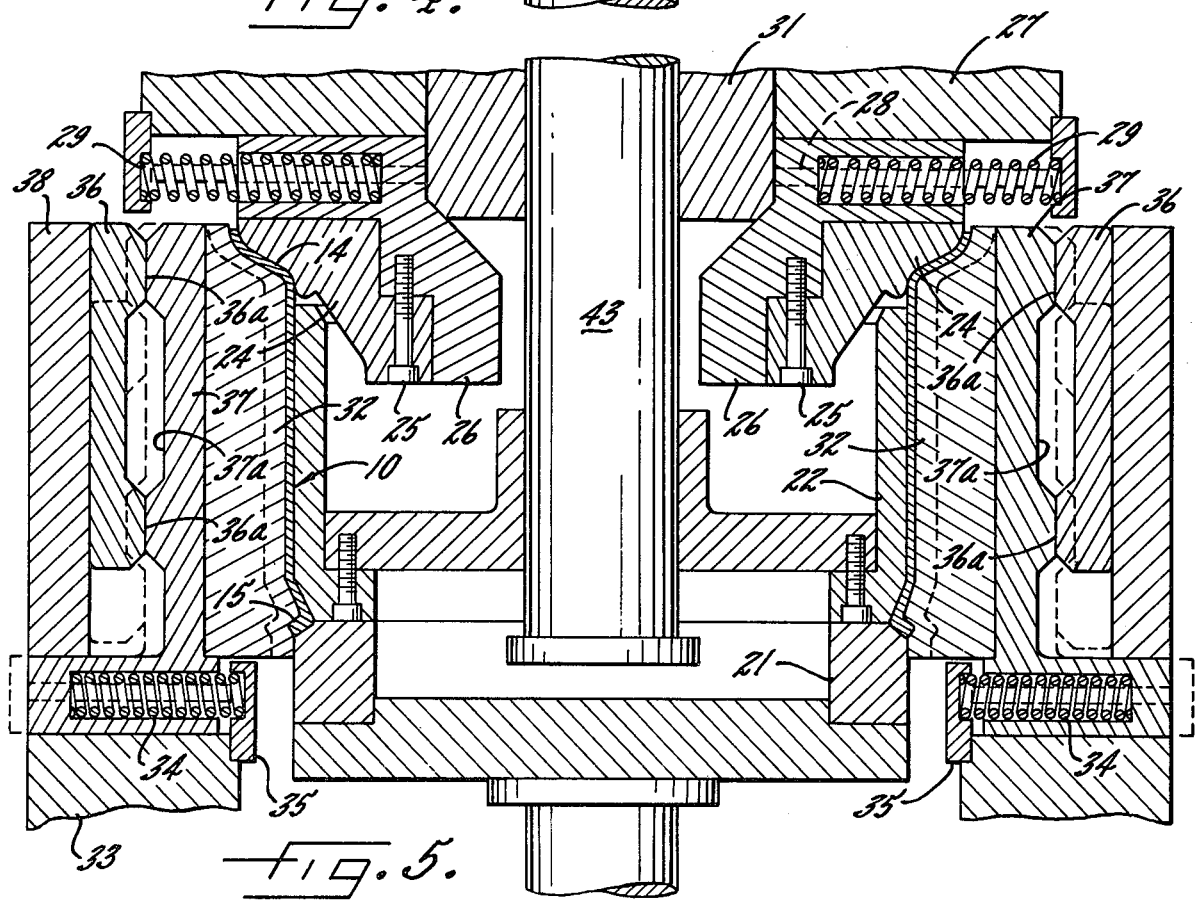

FIG. 5 is the same vertical section shown in FIGS. 2 and 4 with the upper die in its collapsed and fully advanced position; and FIG. 6 is a sequence of cross-sectional views of the truck rim formed in accordance with the system of the present invention showing the profile of the rim blank in successive stages of formation, and including fragmentary views of the shear forming and roller surfaces used to complete the forming of the rim after it is removed from the apparatus of FIGS. 2-5.

While the invention will be described in connection with a certain preferred embodiment, it will be understood that it is not intended to limit the invention to that particular embodiment. On the contrary, it is intended to cover all alternatives, modifications, and equivalents as may be included within the spirit and scope of the invention as defined by the appended claims.

Turning now to the drawings, the system of this invention starts with a flat steel strip which has been rolled into the form of a smooth cylinder 10 and welded together along the abutting axial edges to form a weld seam 11. Subsequent to the welding operation, but prior to the forming of the desired rim profile in the smooth cylinder 10, the weld flash build-up can be easily removed by grinding or milling the weld seam 11 along the smooth surface of the cylinder. This is in contrast to the difficulties presented by weld flash build-up on a cylinder formed from a mill section, which has been pre-formed to the desired rim profile.

Figure 1:
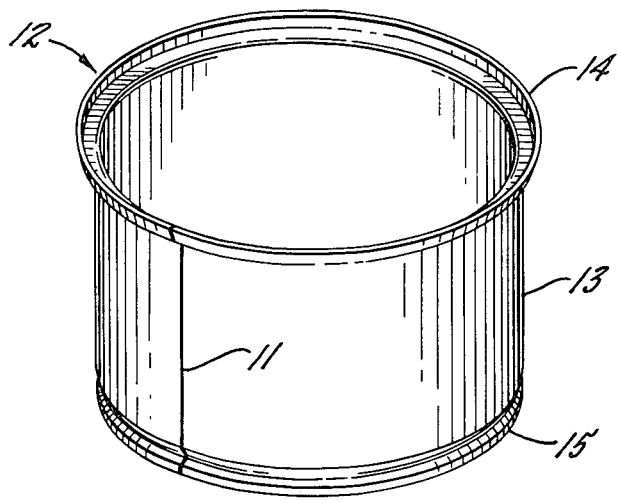
FIG. 1 is a perspective view of a finished flat base truck rim formed by the system of the present invention.
Figure 3:
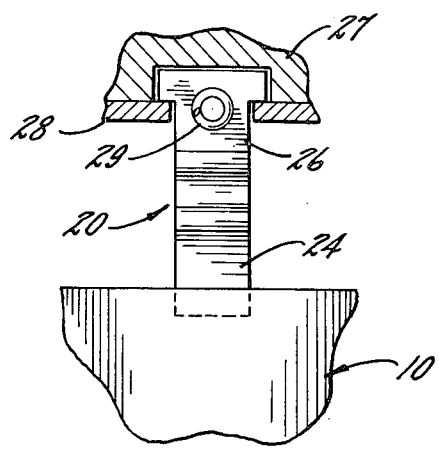
FIG. 3 is a section taken along line 3—3 in FIG. 2.

A completely formed flat base rim 12 is shown in FIG. 1. The rim includes a generally flat central base 13 with a fixed flange 14 at one end and a rim gutter 15 at the other end for receiving a removable side ring. The maximum stresses are normally encountered in the rim gutter 15, and thus it is generally desirable to have the maximum thickness of metal in the gutter, particularly the outboard portion of the gutter (see FIG. 6). The next highest stresses are encountered at the base of the flange 14, and it is generally desirable for the metal thickness in the flange 14 to be somewhere between the thickness of the gutter 15 and that of the base 13. The minimum stresses are encountered in the base 13. If desired, the peripheral areas 13a and 13b of the base 13 may be made somewhat thicker than the central area 13c. For example, in a typical rim the outboard portion of the gutter 15 has a thickness of 0.380 inch, the flange 14 and the inboard portion of the gutter 15 have a thickness of 0.280 inch, the peripheral areas 13a and 13b of the base have a thickness of 0.200 inch, and the central area 13c of the base has a thickness of 0.180 inch.

Turning next to FIGS. 2-5, the illustrative system initiates the forming of the rim in a hydraulically operated press containing four dies, namely a top die 20, a bottom die 21, an inner die 22, and an outer die 23. Three of the dies, namely the top die 20, the bottom die 21 and the inner die 22, are movable in the vertical direction, while two of the dies, namely the top die 20 and the outer die 23, are expandable in the radial direction. That is, the latter two dies comprise a plurality of segments which are movable in the radial direction to increase or decrease the diameters of the respective dies.

The mounting arrangements for the two expandable dies 20 and 23 are similar. Turning first to the top die 20, multiple die segments 24 are fastened by screws 25 to corresponding jaws 26 which are carried by an upper table 27. To permit radial movement of the die segments, each of the jaws has a T-shaped upper end (see FIG. 3) which is slidably received in a T-shaped channel formed by the upper table 27 and a support plate 28 secured to the lower surface of the table 27. Thus, the top die jaws 26 are free to slide radially back and forth along the T-shaped channel to permit the top die 20 formed by the multiple segments 24 to be expanded and collapsed in the radial direction.

To control the radial movement of the top die segments 24, a coil spring 29 extends into a bore in the outboard surface of each jaw 26, with the outer end of the spring 29 bearing against a stationary retention ring 30 carried by the table 28. These springs 29 bias the top die jaws 26 inwardly against a vertically movable backup plug 31 which bears against a surface 26a on the inboard faces of the jaws 26. When the plug 31 is in its raised position, as illustrated in FIG. 5, the coil springs 29 force the jaws 26 to their radially innermost positions, thereby collapsing the top die 20 formed by the multiple segments 24. When the backup plug 31 is lowered to the position illustrated in FIGS. 2 and 4, it cams the jaws 26 outwardly against the bias of the springs 29, thereby expanding the top die 20.

The expandable outer die 23 is also segmented, comprising multiple die segments 32 and jaws 37 carried by a lower table 33. To permit radial movement of the die segments 32, each jaw 37 is slidably received in a channel formed by the table 33 so that the jaws are free to slide radially back and forth along the channel. Thus, the outer die 23 formed by the multiple segments 32 can be expanded and collapsed in the radial direction.

To control the radial movement of the outer die segments 32, a coil spring 34 extends into a bore in the inboard surface of each jaw 37, with the inner end of the spring 34 bearing against a stationary retention ring 35 carried by the table 33. These springs 34 bias the jaws 37 outwardly against a cam ring 36 which is mounted for vertical movement between the jaws 37 and a hold back ring 38. When the cam ring 36 is in its lowered position, as illustrated in broken lines in FIG. 5, the coil springs 34 force the jaws 37 and die segments 32 to their radially outermost positions, thereby expanding the die 23 formed by the multiple segments 32. In this expanded position of the die 23, a recess 37a in the outboard surface of each jaw 37 registers with a raised land 36a on the inboard surface of the cam ring 36, thereby permitting limited outward radial movement of the jaws 37 and the die segments 32 carried thereby. When the cam ring 36 is raised to the position illustrated in solid lines in FIGS. 2, 4 and 5, a cam surface on the top inside periphery of the cam ring cams the jaws 37 inwardly against the bias of the springs 34, thereby closing the outer die 23.

To permit blank cylinders to be loaded into and unloaded from the press, the entire top die assembly, including the upper table 27, the die jaws 26 and the backup plug 31, is mounted for vertical movement above the outer die 23 so as to provide sufficient clearance to enable a rim blank 10 to pass radially therebetween. When the rim blank 10 is inserted in the press (step A in FIG. 6), it is positioned along the inner surface of the outer die 23 with the bottom edge of the cylinder resting on a gutter-forming surface 40 near the lower end of the outer die 23. With the bottom die 21 and the inner die 22 in their lowered positions, as illustrated in FIG. 2, the top die 20 is then lowered with the die segments 24 in their expanded positions, i.e., with the backup plug 31 in its lowermost position.

As the top die 20 is lowered, the top edge of the rim blank 10 engages beveled surfaces 41 on the outboard faces of the die segments 24 (as shown in FIG. 2) and is gradually flared outwardly by continued lowering movement of the top die assembly. This outward flaring of the upper end of the blank 10 continues until the top edge of the blank abuts a shoulder 42 extending outwardly from the beveled die surfaces 41 (as shown in FIG. 4). Continued downward movement of the top die assembly then applies a compressive axial load on the flared blank, thereby pushing the entire blank down into the gutter-forming cavity formed by the combination of the outer die 23, the bottom die 21 and the inner die 22. As illustrated in FIG. 4, this compressive load not only forces the lower end of the rim blank into conformity with the configuration of the die cavity, but also increases the thickness of the metal in the gutter portion of the die cavity. This portion of the die cavity is deliberately designed to be wider than the original thickness of the rim blank, and the compressive forces applied to the blank cause the metal to flow until it completely fills the gutter-forming cavity (step B in FIG. 6). As explained previously, the increased metal thickness in the gutter portion of the rim is desirable because this is the area in which the maximum stresses are encountered during rim usage.

In accordance with one important aspect of the present invention, the rim gutter is warm or hot formed by heating the lower end of the cylinder before the gutter is rough formed by the dies. In the preferred embodiment of the invention, the rim gutter is warm formed by heating the metal to a warm forming temperature, suitably in the range of from about 800° to about 1200° F., to improve the ductility of the metal just enough to permit it to flow to the extent required to achieve the increased metal thickness in the rim gutter, without adversely affecting the mechanical properties of the metal. When used in combination with the other portions of the rim-forming system provided by this invention, this warm or hot forming operation produces the requisite metal thickness in the rim gutter without the need for any subsequent shot peening or other treatment of the gutter to improve its fatigue life, and with only about half the press tonnage required in a comparable cold forming process. Indeed, the system of this invention permits the use of conventional hot rolled, rimmed low carbon steel, which is less expensive than the draw quality steel that has been used in most previous commercial processes for forming flat base truck rims from flat strip. The warm forming temperatures are preferred over hot forming because they conserve energy, as well as avoiding oxidation problems and excessive cooling cycles.

In accordance with another important aspect of the present invention, the same die that flares the upper end of the blank cylinder is expanded to complete the forming of the fixed rim flange after the compressive forming of the rim gutter. Thus, after the top die 20 has been advanced to the position illustrated in FIG. 4, the top die is raised slightly, the backup plug 31 is raised to permit the die segments 24 to retract inwardly and thereby collapse the top die assembly, and then the top die 20 is driven downwardly again so that the outboard portion of the die face, above the flange 42, presses the flared upper portion of the rim blank down against the top of the outer die 23 (step C in FIG. 6). As can be seen most clearly in FIG. 5, the complementary surfaces formed by the outboard portions of the top die segments 24 and the top of the outer die 23 complete the rough forming of the fixed flange 14.

To remove the rim blank from the press, the top die 20 is retracted to its fully elevated position (not shown), and a center post 43 is also elevated to raise the inner die 22 far enough above the outer die 23 to permit removal of the roughly formed rim. After the top die 20 and the inner die 22 have been raised to clear the inner surface of the rim, the outer die 23 is expanded to clear the gutter on the outer surface of the rim. Thus, the cam ring 36 is lowered to its broken line position as shown in FIG. 5 so that the springs 34 move the outer die segments 32 to their radially outermost positions, thereby retracting the gutter-forming surface on the inside of the outer die segments 32 from the gutter in the rim.

The rim is then free to be elevated by upward movement of the bottom die 21. When the bottom edge of the rim clears the top of the outer die 23, the rim is unloaded from the press by moving it laterally between the outer die 23 and the elevated top die 20 and inner die 22. The bottom die 21 is then returned to its lowered positions, the outer die 23 is collapsed, and the backup plug 31 is lowered to expand the top die 20, thereby returning the press to its original condition ready to receive another blank cylinder.

Form the die-forming station, the roughly formed rim is transferred to a shear forming station where the flat base 13 of the rim blank is reduced in thickness, thereby also extending the axial length of the rim. More particularly, in the illustrative example, the peripheral areas 13a and 13b of the base are shear formed to reduce the thickness of the original strip stock from 0.280 inch, and the central area 13c is shear formed to reduce the thickness to 0.180 inch. In the region between the peripheral area 13a and the bear seat radius 14a of the rim flange 14, the outboard surface of the rim is formed with a 5° taper to provide a gradual transition between the 0.200-inch thickness of the peripheral area 13a of the rim base and the 0.280-inch thickness of the rim flange 14. It will be understood that this shear forming operation, which is illustrated schematically in step D of FIG. 6, may be carried out by conventional shear forming equipment, which is well known in the rim forming art.

After the shear forming operation has been completed, the rim blank is transferred to a roll forming station illustrated in step E of FIG. 6. The roll forming performs three principal functions, namely (1) completion of the forming of the fixed rim flange 14 by reducing the radius of curvature, (2) forming the transition region between the rim base and the rim gutter, and (3) bending the edge of the rim gutter 15 slightly to bring it to the desired angle of 85-90° relative to the rim axis and to refine the gutter outside diameter, i.e., with the edge of the rim extending substantially parallel to the rim axis. It will be appreciated that the metal working effected by this roll forming operation is relatively mild so that there is no need to employ expensive draw quality steel.

As can be seen from the foregoing detailed description, this invention provides an improved system for producing flat base truck rims from flat strip which avoids excessive cold working of the flat strip and does not require shot peening of the rim gutter. High quality flat base truck rims can be produced from flat strip made of hot rolled, rimmed, low carbon steel, which can be obtained at a substantially lower cost than draw quality steel strip, and yet the metal thickness can be increased by as much as 30–50 per cent in the high stress areas of the rim. Using the system of this invention, flat base truck rims can be produced from flat strip at production rates as high as 250 to 350 rims per hour. The system requires only a relatively small number of process steps which can be carried out efficiently and economically by automated equipment.

I claim as my invention:

1. A method of forming a flat base truck rim from a flat strip of hot rolled, rimmed, low carbon steel rolled into the form of a smooth cylinder and welded together along the abutting axial edges, said method comprising the steps of
   a. advancing a plurality of dies located at opposite ends of the cylinder relatively toward each other in the direction of the cylinder axis to flare a first end of the cylinder radially outwardly while rough forming a rim gutter on the other end of the cylinder, increasing the radial thickness of the metal forming the rim gutter during the rough forming thereof by applying a compressive axial load to the cylinder and providing a gutter-forming die cavity wider than the starting thickness of the cylinder,
   b. radially shifting the flaring die at said first end of the cylinder and again advancing said dies relatively toward each other in the direction of the cylinder axis to deform the outwardly flared portion of the cylinder to rough form a fixed flange at that end of the cylinder,
   c. shear forming the flat base of the rim to reduce the radial thickness thereof in the low stress area between the gutter and the fixed flange, and
   d. roll forming the rim to provide the desired final profile in the fixed flange and the gutter.

2. A method of forming a flat base truck rim as set forth in claim 1 wherein the gutter end of the cylinder is heated before advancing said dies to rough form the gutter.

3. A method of forming a flat base truck rim as set forth in claim 2 wherein the rim gutter is warm formed by heating that end of the cylinder to a temperature in the range of from about 800° to about 1200° F. before advancing said dies to rough form the gutter.

4. A method of forming a flat base truck rim as set forth in claim 1 wherein said flaring die is a radially expandable die which is expanded during the flaring step and collapsed during the flange forming step so that different portions of the same die are used to effect both the flaring and the flange forming.

5. A method of forming a flat base truck rim as set forth in claim 1 wherein during the rough forming of the gutter and the fixed flange the outer surface of said cylinder is supported by a radially expandable die which forms the outboard surfaces of the gutter and the fixed flange and which is collapsed during the forming steps and then expanded to permit the rough formed rim to be removed therefrom.

6. A method of forming a flat base truck rim as set forth in claim 1 wherein the shear forming reduces the entire flat base portion of the rim to a thickness less than the starting thickness of the flat strip, and reduces the central area of the flat base to a thickness less than the thickness of the peripheral areas thereof.

7. A method of forming a flat base truck rim, said method comprising the steps of
a. forming a flat strip of hot, rolled, rimmed, low carbon steel into a smooth cylinder welded together along abutting axial edges,
b. heating one end of the cylinder to avoid degradation of the ductility and fatigue life of the cylinder and forming a rim gutter at the heated end of the cylinder in a gutter-forming die cavity wider than the starting thickness of the cylinder while applying a compressive axial load to the cylinder to increase the metal thickness in the rim gutter,
c. forming a fixed flange at the other end of the cylinder by flaring the other end radially outwardly by a first surface of an expandable die in a first radial position,
d. rough forming said fixed flange by a second surface of the same expandable die in a second radial position, and
e. reducing the radial thickness of the flat base of the rim between the rim gutter and the fixed flange.

8. A method of forming a flat base truck rim as set forth in claim 7 wherein the rim gutter is warm formed by heating that end of the cylinder to a temperature in the range of from about 800° to about 1200° F. before applying said compressive axial load.

9. A method of forming a flat base truck rim as set forth in claim 7 wherein the radial thickness of the flat base of the rim is reduced by shear forming.

10. A method of forming a flat base truck rim as set forth in claim 7 wherein the desired final profiles of the rim gutter and the fixed flange are formed by roll forming.

11. A method of forming a flat base truck rim from a flat strip of steel rolled into the form of a smooth cylinder and welded together along the abutting axial edges, said method comprising the steps of
a. heating one end of the cylinder,
b. advancing a plurality of dies located at opposite ends of the cylinder relatively toward each other in the direction of the cylinder axis to flare the other end of the cylinder radially outwardly while forming a rim gutter by applying a compressive axial load to the cylinder to force the heated end of the cylinder into a gutter-forming die cavity wider than the starting thickness of the cylinder,
c. radially shifting the flaring die and again advancing said dies relatively toward each other in the direction of the cylinder axis to deform the outwardly flared portion of the cylinder to form a fixed flange at that end of the cylinder, and
d. shear forming the flat base of the rim to reduce the radial thickness thereof in the low stress area between the gutter and the rim flange.

12. A method of forming a flat base truck rim as set forth in claim 11 wherein the rim gutter is warm formed by heating that end of the cylinder to a temperature in the range of from about 800° to about 1200° F. before advancing said dies to rough form the gutter.

13. A method of forming a flat base truck rim as set forth in claim 11 wherein said flaring die is a radially expandable die which is in a first radial position during the flaring step and in a second radial position during the flange forming step so that different portions of the same die are used to effect both the flaring and the flange forming.

* * * * *